United States Patent Office 3,351,100
Patented Nov. 7, 1967

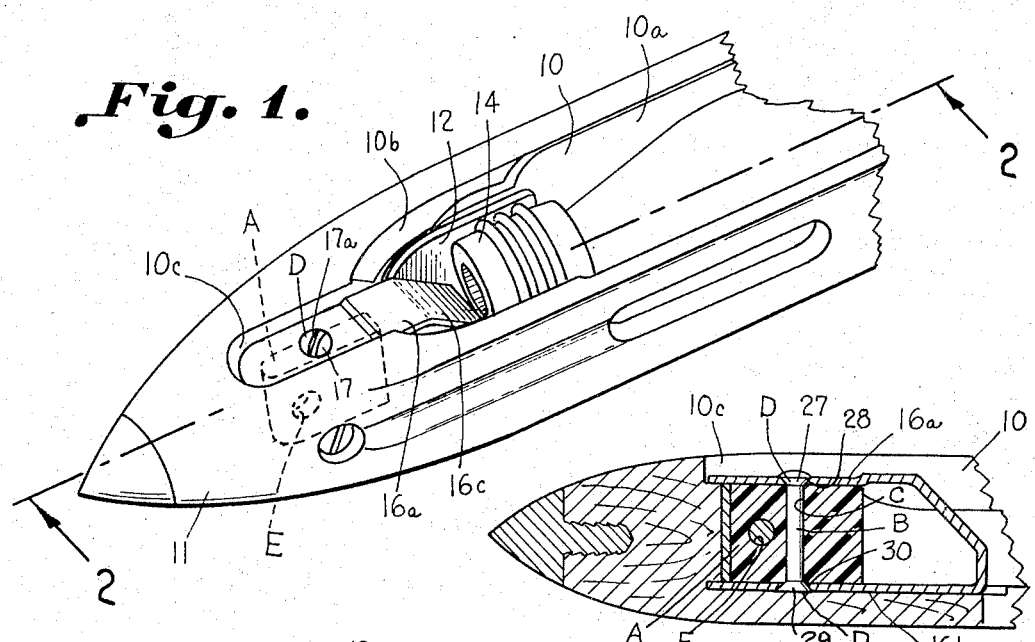
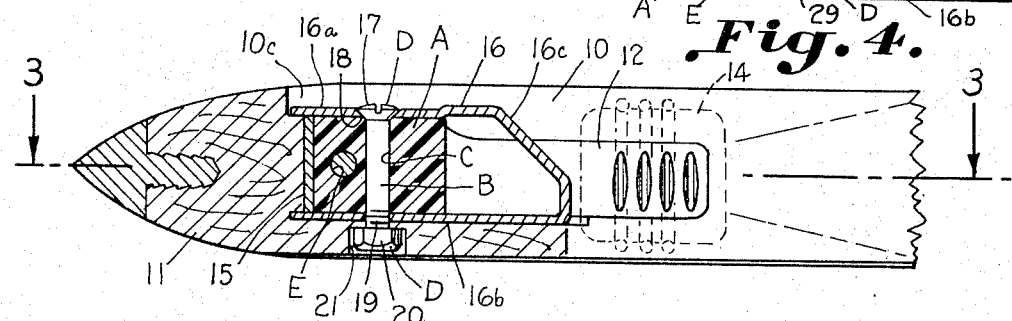
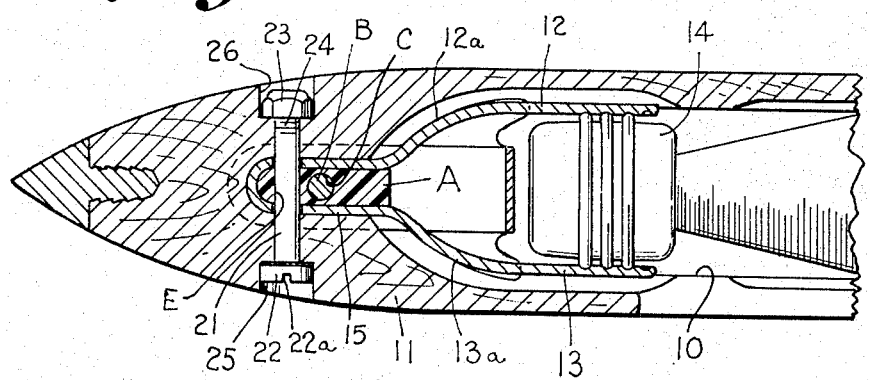
Nov. 7, 1967   J. B. BOWEN ET AL   3,351,100
SHUTTLE GRIP AND STRAP ASSEMBLY
Filed March 24, 1966
Fig. 1.
Fig. 2.
Fig. 3.
Fig. 4.
INVENTORS.
JAMES B. BOWEN &
PICKENS W. MILLER, JR.
ATTORNEYS.

3,351,100
SHUTTLE GRIP AND STRAP ASSEMBLY
James B. Bowen and Pickens W. Miller, Jr., Greenville,
S.C., assignors to Steel Heddle Manufacturing Company, Paris, S.C., a corporation of South Carolina
Filed Mar. 24, 1966, Ser. No. 537,085
2 Claims. (Cl. 139—207)

ABSTRACT OF THE DISCLOSURE

The invention contemplates the use of an insert constructed of nylon and the like, substantially filling the U-shaped portion of the grip for exerting a tight locking action upon an elongated vertical fastening element by reason of plastic set to insure proper grip spacing, absorb shock and avoid damage to the warp which would result should the shank work its way up. Preferably the horizontal grip bolt passes also through the insert with a tight grip to unite with the vertical element to resist longitudinal forces on the grip.

---

This invention relates to an improvement in a shuttle grip and strap assembly especially adapted to prevent warp damage due to failure of the strap cover fastening means while absorbing shock and maintaining proper grip opening.

Formerly, screw fastening means were used to maintain the strap cover portion in assembly with the grip in a shuttle wherein the screw fastening means was subject to failure permitting the screw to work its way up into a position to damage the warp. Often the entire upper portion of the shed was broken out occasioning considerable down-time, as well as labor, in repairing the warp. Traditionally, shims made of wood were positioned forwardly of such cover screw fastening means for maintaining proper grip opening. Efforts have been made to prevent damage to the warp resulting from cover screw failure including taping the cover screw down from the top and the use of horizontal inserts covering the top of the screw to prevent its rising after screw failure to do damage to the warp. More recently vertical threaded bushings have been used to receive a threaded shank for preventing damage to the wrap. Such devices have met with considerable success, but their effectiveness is limited to the prevention of a break out due to a cover screw rising after failure thereof. The wooden shims referred to above become so deformed through usage that a permanent dimensional change takes place resulting in their faliure to maintain proper grip opening. Due to the repeated shocks occurring during weaving the cover screw and horizontal grip screw, as well as the other parts of the assembly, are subject to considerable wear and become loose or broken.

Accordingly, it is an important object of this invention to provide an improved and simplified means of avoiding cover screw failure, wherein should such failure occur the cover screw is retained avoiding its rising to do damage to the warp.

Another important object of the invention is to provide a shuttle grip and strap assembly wherein an element is provided for avoiding warp damage due to cover screw failure while maintaining a proper shuttle grip opening even after extensive use.

Another object of the invention is to provide a retaining member for the cover screw while absorbing shock during weaving and maintaining proper grip opening.

Another important object of the invention is to provide a grip or a lock upon the horziontal shuttle grip screw while absorbing shock occasioned during weaving.

Another important object of the invention is the provision of a simple grip and strap assembly including an element for absorbing shock to thus avoid wear on the parts while avoiding warp damage due to cover screw failure.

Still another object of the invention is to provide a simplified grip and strap assembly which is easy to assemble and disassemble within the shuttle.

A preferred embodiment of the invention contemplates the use of an insert constructed of nylon and the like, substantially filling the U-shaped shank portion of the grip for receiving the cover screw and the horizontal grip bolt.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIGURE 1 is a perspective view illustrating a shuttle having a shuttle grip and strap assembly constructed in accordance with the present invention, FIGURE 2 is a longitudinal sectional elevation taken on the line 2—2 in FIGURE 1, FIGURE 3 is a sectional plan view taken on the line 3—3 in FIGURE 2, and FIGURE 4 is a longitudinal sectional elevation similar to FIGURE 2, illustrating a modified grip and strap assembly constructed in accordance with the invention.

The drawing illustrates a shuttle grip and strap assembly constructed in accordance with the invention wherein a grip having a substantially U-shaped shank portion has a strap having a substantially horizontal upper or cover portion overlying the U-shaped shank portion. An insert A constructed of relatively rigid incompressible synthetic polymeric material having plastic set as to be capable of exerting a tight locking action upon an element passing therethrough with a tight fit is provided. The insert substantially fills the space within the U-shaped shank portion as to insure proper grip opening. An elongated vertical fastening member has an elognated shank portion B passing through an intermediate portion of the insert and having a tight fit therein as at C so that the insert lockingly grips the elongated shank portion of the fastening member. Enlarged members D are carried by the terminal portions of the elongated shank portion of the vertical fastening member securing the cover and grip portions together. Thus, shock is absorbed by the insert which also positively retains the elongated shank portion of the fastening member against working its way up to cause damage to the warp while maintaining a proper grip opening even after extensive use. A substantially horizontal grip bolt passes through the U-shaped shank portion having a tight fit as at E within said insert. Thus, the insert also grips the bolt with a locking action.

The grip and strap assembly is illustrated in the drawing as being positioned within a recess 10 within a shuttle block 11. The recess 10 has an elongated center portion 10a and an inwardly tapering portion 10b which terminates in a substantially U-shaped portion 10c for accommodating the U-shaped shank portion of a shuttle grip. The shuttle grip includes a pair of spring arms 12 and 13 for receiving the butt 14 of a bobbin therebetween. The spring arms 12 and 13 taper inwardly as at 12a and 13a terminating in a U-shaped shank portion 15 which is received within the U-shaped recess 10c within the shuttle block.

A shuttle strap is illustrated at 16 and includes a substantially horizontal upper or cover portion 16a and a horizontal base portion 16b. An inclined portion 16c joins the cover and base portions 16a and 16b, respectively, and acts as a guide for the bobbin during a transfer operation directing the butt 14 to a proper position between the gripper spring arms 12 and 13.

Normally, the cover 16a is secured by a screw either passing into the shuttle block or passing beneath the strap and fastened with a nut. During the weaving operation successive transfer operations cause the cover screw to become broken or loose so that the screw works its way up to be in a position to damage the warp shed above the shuttle. In conventional constructions a wooden shim or insert is positioned forwardly of the cover screw so as to maintain proper opening between the spring arms 12 and 13 to receive the shuttle butt 14 therebetween for exerting the proper gripping action thereon to maintain the bobbin in proper alignment during weaving. Again due to the repeated impacts occasioned by repeated bobbin change or transfer operations the wooden blocks become so deformed as to no longer be a factor in maintaining proper grip opening.

The insert A is constructed of relatively rigid incompressible synthetic polymeric material, such as nylon and the like. Such material has a characteristic capability of exerting a tight locking action upon an element passing therethrough with a tight fit. Such characteristic or plastic set permits the insert A to exert a tight locking action upon the shank of fastening element passing through an opening provided therein. It is important that the material of the insert be rigid and highly capable of resisting compressive forces, as well as being able to exert a tight locking action upon the shank of a fastening element passing therethrough. Such material may be described as being realtively rigid but resilient. The insert A substantially conforms to the inner surface of the U-shaped shank 15 so as to substantially fill the space within the shank and resist without substantial deformation forces tending to close the spring gripper arms 12 and 13 so as to maintain proper grip opening for reception of the bobbin. An elongated vertical fastening member has an elongated shank portion B passing through an intermediate portion of the insert. In other words, an insert portion has been provided adjacent the terminal portion of the U-shaped shank 15 for receiving the cover fastening means which includes an elongated shank which is preferably not threaded in that portion gripped by the insert A. Threads may be desirable, however, wherein especially strong gripping action is desired between the fastening means and the insert.

A vertical opening or bore is provided within the insert A for receiving the shank portion B by a tight fit therein as indicated at C. Thus, the insert lockingly grips the elongated shank portion of the fastening member. Thus, even if the lower portion of the shank were unrestrained by other fastening means the gripping action exerted thereon by the insert would prevent if from working up during weaving to cause any interference with the warp.

Enlarged members D are provided upon the terminal portions of the elongated shank in the form of a head 17 which has a slot therein 17a for receiving a screwdriver. The head is preferably countersunk within the cover as at 18. A threaded terminal portion 19 of the shank receives a nut 20 positioned within a recess 21 within the lower portion of the shuttle block. The recess 21 may terminate short of the strap base 16b, as illustrated in FIGURE 2, or it might extend through the lower portion of the shuttle block into the recess 10c. It may also be desirable to fix the nut 20 within a recess (not shown) extending from the recess 10c downwardly terminating short of the shuttle block. This would even further facilitate the placement of the grip and strap assembly within the shuttle block and its removal therefrom since the cover screw gripping the head 17 and the shank B could simply be turned so as to unscrew same from the nut 20 permitting removal of the assembly without the necessity of removing the cover screw from the grip and strap which are removed as a unit.

A substantially horizontal grip bolt which includes a shank 21 having a head 22 on one end is positioned so as to pass through the insert A. A tight fit is provided between the shank portion and a bore within the insert as illustrated at E. A nut 23 is carried by the end of the grip bolt opposite the head 22 and is received on a threaded portion 24 of the shank. Preferably, the shank is not threaded in the portion engaged by the insert but conceivably such could be threaded so as to increase the locking action between the insert and the bolt. The head 22 has a slot 22a for accommodating a screwdriver and is positioned within a recess 25 within the shuttle block. The nut 23 is positioned within a recess 26 within the shuttle block.

FIGURE 4 illustrates a slightly modified embodiment wherein a rivet is used as a cover screw fastening means. The rivet has a head 27 which is countersunk as at 28 within the cover 16a. A flush bottom portion 29 is secured within the base 16b countersunk therein as at 30. The rivet may be a pan head type rivet which may be fastened in position as described above by a riveting machine. Corresponding reference characters where applicable have been used in FIGURE 4 in addition to those mentioned above to identify like parts. By making use of a rivet as described above, the entire assembly may be simply removed from the recess within the shuttle block after removing the gripper cross bolt.

While a preferred embodiment of the invention has been described using specific terms, such description is for illustrative purposes only, and it is to be understood that changes and variations may be made without departing from the spirit or scope of the following claims.

What is claimed is:

1. In a shuttle grip and strap assembly having, a grip including a substantially U-shaped shank portion and a strap having a substantially horizontal cover portion overlying said U-shaped shank portion, an insert constructed of relatively rigid incompressible synthetic polymeric material having plastic set as to be capable of exerting a tight locking action upon an element passing therethrough with a tight fit, said insert substantially filling the space within said U-shaped shank portion as to insure proper grip opening, an elongated vertical fastening member having an elongated shank portion passing through an intermediate portion of said insert and having a tight fit therein so that the insert lockingly grips the elongated shank portion of the fastening member, and enlarged members carried by the terminal portions of said elongated shank portion of the vertical fastening member securing the cover and grip portions together, whereby shock is absorbed by the insert which also positively retains the elongated shank portion of the fastening member against working its way up to cause damage to the warp while maintaining a proper grip opening even after extensive use.

2. The structure set forth in claim 1 including, a substantially horizontal grip bolt passing through said U-shaped shank portion having a tight fit within said insert, whereby said insert lockingly grips the bolt.

References Cited

UNITED STATES PATENTS

| | | | |
|---|---|---|---|
| 1,571,149 | 1/1926 | Stimpson et al. | 139—207 |
| 2,154,050 | 4/1939 | Lundgren | 139—207 |
| 2,918,948 | 12/1959 | Holt | 139—207 |
| 3,181,572 | 5/1965 | Mogayzel | 139—207 |
| 3,233,635 | 2/1966 | Klocker et al. | 139—207 |

MERVIN STEIN, *Primary Examiner.*

J. KEE CHI, *Assistant Examiner.*